(12) United States Patent
Scrivner et al.

(10) Patent No.: US 12,196,594 B2
(45) Date of Patent: Jan. 14, 2025

(54) FLOW METER COUPLING SYSTEM FOR REDUCED AXIAL STRESS

(71) Applicant: MICRO MOTION, INC., Boulder, CO (US)

(72) Inventors: Stephen M. Scrivner, Erie, CO (US); Curt K. Lacey, Brighton, CO (US); Sven M. Nuesken, Longmont, CO (US); David Lange Rann, Boulder, CO (US)

(73) Assignee: MICRO MOTION, INC., Boulder, CO (US)

( * ) Notice: Subject to any disclaimer, the term of this patent is extended or adjusted under 35 U.S.C. 154(b) by 233 days.

(21) Appl. No.: 17/907,903

(22) PCT Filed: Mar. 5, 2020

(86) PCT No.: PCT/US2020/021240
§ 371 (c)(1),
(2) Date: Aug. 29, 2022

(87) PCT Pub. No.: WO2021/177967
PCT Pub. Date: Sep. 10, 2021

(65) Prior Publication Data
US 2023/0145225 A1   May 11, 2023

(51) Int. Cl.
*G01F 15/18* (2006.01)
*G01F 1/84* (2006.01)

(52) U.S. Cl.
CPC .............. *G01F 15/185* (2013.01); *G01F 1/84* (2013.01)

(58) Field of Classification Search
CPC .... G01F 1/8418; G01F 1/8413; G01F 1/8409; G01F 1/07; G01F 15/18; G01F 15/185;
(Continued)

(56) References Cited

U.S. PATENT DOCUMENTS 1,997,845 A * 4/1935 Adams ................... G01F 15/185
285/298
3,527,245 A * 9/1970 Lamontagne ......... G01F 15/185
285/31
(Continued)

FOREIGN PATENT DOCUMENTS

CN   201680884 U   12/2010
CN   203380816 U    1/2014
(Continued)

*Primary Examiner* — Tran M. Tran
(74) *Attorney, Agent, or Firm* — The Ollila Law Group LLC (57) ABSTRACT

A flow meter coupling system (300) to reduce axial stress on a flow meter (302) comprising a first flow meter flange (314a) and a second flow meter flange (314b) is provided. The flow meter coupling system (300) comprises a first process fluid member (304) configured to be coupled to the first flow meter flange (314a) of the flow meter (302), a second process fluid member (306), and a second connector member (310) configured to be rigidly coupled to at least one of the second flow meter flange (314b) or the second process fluid member (306) and coupled to another of the second flow meter flange (314b) or the second process fluid member (306) in a manner that provides substantially no axial stress.

17 Claims, 11 Drawing Sheets

(58) Field of Classification Search
CPC ..... F16L 23/036; F16L 23/0286; F16L 23/06; F16L 37/20
See application file for complete search history.

(56) References Cited

U.S. PATENT DOCUMENTS

| | | | | |
|---|---|---|---|---|
| 4,342,336 | A * | 8/1982 | Satterthwaite | F16J 15/46 |
| | | | | 277/467 |
| 4,448,425 | A | 5/1984 | von Bergen | |
| 4,549,751 | A * | 10/1985 | Grove, Jr. | G01F 15/18 |
| | | | | 285/404 |
| 4,570,913 | A | 2/1986 | Rosser | |
| 4,691,727 | A * | 9/1987 | Zorb | G01F 15/185 |
| | | | | 137/364 |
| 5,145,214 | A * | 9/1992 | Hunt | G01F 15/18 |
| | | | | 73/201 |
| 5,209,266 | A * | 5/1993 | Hiemsoth | F16L 55/1283 |
| | | | | 138/93 |
| 5,373,745 | A | 12/1994 | Cage | |
| 5,632,632 | A * | 5/1997 | Huotari | G01F 15/185 |
| | | | | 439/100 |
| 5,778,919 | A | 7/1998 | Petrone | |
| 5,909,904 | A * | 6/1999 | Shea | F16L 23/06 |
| | | | | 285/414 |
| 6,626,470 | B1 * | 9/2003 | Appleford | E21B 43/013 |
| | | | | 285/920 |
| 6,758,467 | B2 | 7/2004 | Kitaura | |
| 6,782,333 | B2 * | 8/2004 | Baker | G01F 25/13 |
| | | | | 73/1.35 |
| 6,889,559 | B2 * | 5/2005 | Gimson | G01F 25/10 |
| | | | | 73/861 |
| 7,497,130 | B2 * | 3/2009 | Woods | G01F 15/18 |
| | | | | 73/861.357 |
| 7,819,139 | B2 * | 10/2010 | Woods | G01F 1/849 |
| | | | | 138/109 |
| 8,079,271 | B2 * | 12/2011 | Hoecker | G01F 1/3209 |
| | | | | 73/861.64 |
| 8,161,812 | B1 * | 4/2012 | Fischer | G01F 15/185 |
| | | | | 73/261 |
| 8,220,839 | B2 * | 7/2012 | Hall | F16L 27/1274 |
| | | | | 285/302 |
| 8,240,718 | B2 * | 8/2012 | Morton | F16L 37/18 |
| | | | | 285/84 |
| 8,302,496 | B2 * | 11/2012 | Furey | G01D 11/30 |
| | | | | 73/866.5 |
| 8,342,200 | B1 * | 1/2013 | Payne | B25B 27/24 |
| | | | | 269/95 |
| 8,480,883 | B2 * | 7/2013 | Stimpson | G01F 15/125 |
| | | | | 138/104 |
| 9,151,648 | B2 * | 10/2015 | Strom | G01F 15/18 |
| 9,329,017 | B2 * | 5/2016 | Spomer | G01F 1/8413 |
| 9,354,095 | B2 * | 5/2016 | Sorenson | G01F 5/00 |
| 9,459,126 | B2 * | 10/2016 | Verhaagen | G01F 1/372 |
| 9,581,486 | B2 | 2/2017 | Rudroff | |
| 9,664,318 | B2 * | 5/2017 | Crompton | F16L 27/12 |
| 9,671,270 | B2 * | 6/2017 | Grewal | G01F 15/14 |
| 9,677,714 | B2 | 6/2017 | Wray | |
| 9,695,967 | B2 * | 7/2017 | Utsch | B25B 5/125 |
| 9,880,032 | B1 * | 1/2018 | Linney | G01F 1/37 |
| 9,891,089 | B2 * | 2/2018 | Salser | G01F 25/17 |
| 9,927,277 | B1 * | 3/2018 | Lorentz | G01F 15/185 |
| 10,012,333 | B2 * | 7/2018 | Sandman | F16L 25/14 |
| 10,081,039 | B2 * | 9/2018 | Stehle | G01F 15/12 |
| 10,132,664 | B2 * | 11/2018 | Jones | G01F 15/185 |
| 10,386,218 | B2 * | 8/2019 | Amann | G01F 1/8409 |
| 10,619,771 | B2 * | 4/2020 | Sulzer | G01N 9/10 |
| 11,060,637 | B2 * | 7/2021 | Takeda | F16L 47/145 |
| 11,150,118 | B2 * | 10/2021 | Gledhill, III | G01F 1/66 |
| 11,221,243 | B2 * | 1/2022 | Caira | G01F 15/18 |
| 11,808,149 | B2 * | 11/2023 | Syresin | E21B 47/10 |
| 11,982,556 | B2 * | 5/2024 | Xu | G01F 1/8409 |
| 2006/0022466 | A1 * | 2/2006 | Sand | G01F 15/185 |
| | | | | 285/412 |
| 2006/0070437 | A1 * | 4/2006 | Diederichs | F16L 19/0218 |
| | | | | 73/272 R |
| 2009/0166976 | A1 | 7/2009 | Rubner-Petersen et al. | |
| 2012/0118073 | A1 * | 5/2012 | Kerrom | G01F 15/18 |
| | | | | 73/861.08 |
| 2015/0134275 | A1 * | 5/2015 | Chen | G01F 1/88 |
| | | | | 73/861.63 |
| 2015/0209787 | A1 * | 7/2015 | Brann | F16L 37/20 |
| | | | | 29/469 |
| 2015/0260320 | A1 * | 9/2015 | Huang | F04D 29/4293 |
| | | | | 285/414 |
| 2019/0277682 | A1 * | 9/2019 | Ricken | G01F 15/00 |
| 2020/0249065 | A1 * | 8/2020 | Allen | G01F 1/28 |
| 2021/0231476 | A1 * | 7/2021 | Däscher et al. | G01F 1/40 |
| 2024/0142286 | A1 * | 5/2024 | Zhu | G01F 15/185 |

FOREIGN PATENT DOCUMENTS

| | | |
|---|---|---|
| CN | 103835277 B | 2/2016 |
| CN | 207379560 U | 5/2018 |
| DE | 2409074 A1 | 9/1975 |
| DE | 19725805 A1 | 12/1998 |
| EP | 1006343 A1 | 6/2000 |
| EP | 1925917 A1 | 5/2008 |
| JP | 2008275682 A | 11/2008 |
| JP | 2010054512 A | 3/2010 |
| WO | 9608697 A2 | 3/1996 |

* cited by examiner

```
┌─────────────────────────────────────────────┐
│ COUPLE A SECOND CONNECTOR CONDUIT MEMBER TO A│──410
│ SECOND CONNECTOR RIGID INTERFACING MEMBER    │
└─────────────────────────────────────────────┘
                     │
                     ▼
┌─────────────────────────────────────────────┐
│ COUPLE THE SECOND CONNECTOR RIGID INTERFACING│
│ MEMBER TO THE AT LEAST ONE OF THE SECOND FLOW│──412
│ OR THE SECOND PROCESS FLUID MEMBER           │
└─────────────────────────────────────────────┘
```

```
┌─────────────────────────────────────────────┐
│ SLIDABLY COUPLE A SECOND CONNECTOR MEMBER    │
│ SLIDABLE COUPLER SEALABLY TO THE SECOND      │──414
│ CONNECTOR CONDUIT MEMBER                     │
└─────────────────────────────────────────────┘
                     │
                     ▼
┌─────────────────────────────────────────────┐
│ THREAD A SEAL SEAT AND AN INFLATABLE SEAL    │
│ POSITIONED WITHIN THE SEAL SEAT OVER THE     │──416
│ SECOND CONNECTOR CONDUIT MEMBER              │
└─────────────────────────────────────────────┘
                     │
                     ▼
┌─────────────────────────────────────────────┐
│ INFLATE THE INFLATABLE SEAL TO PROVIDE RADIAL│
│ PRESSURE TO THE SECOND CONNECTOR CONDUIT     │──418
│ MEMBER                                       │
└─────────────────────────────────────────────┘
```

FLOW METER COUPLING SYSTEM FOR REDUCED AXIAL STRESS

TECHNICAL FIELD

The present Application is directed towards flow meter measurement systems, and more particularly, to a flow meter coupling system.

BACKGROUND

Coriolis flow meters may be used to measure flow meter variables, for example mass flow rate, density, and volume flow rate, of a fluid. The fluid may comprise liquids, gases, combined liquids and gases, solids suspended in liquids, and liquids including gases and suspended solids.

Figure 1:
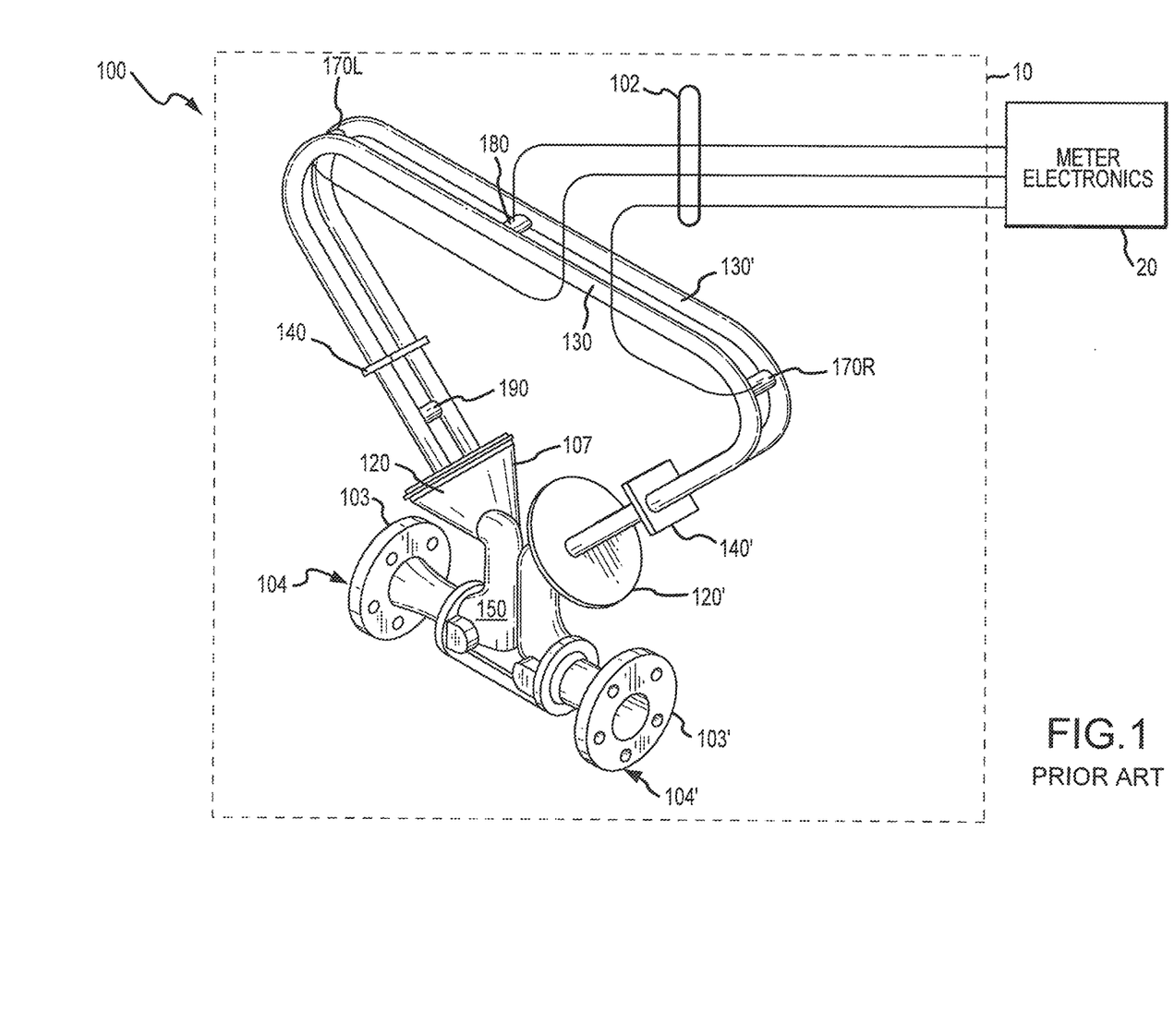
FIG. 1 depicts flow meter 100, in accordance with an embodiment.

FIG. 1 depicts an example flow meter 100. Flow meter 100 comprises a meter assembly 10 and a meter electronics 20. Meter assembly 10 responds to changes in a fluid flow. Meter electronics 20 receives raw data from meter assembly 10 via leads 102 and determines flow meter variables for the fluid under test, in addition to other information.

Meter assembly 10 includes manifold 150, flanges 103 and 103', a pair of parallel flow tubes 130 and 130', driver 180, and a pair of velocity pick-off sensors 170L and 170R. Flow tubes 130 and 130' bend at two symmetrical locations along their length and are essentially parallel throughout their length. Brace bars 140 and 140' serve to define an axis about which each flow tube oscillates.

When flanges 103 and 103' are connected, via inlet end 104 and exit end 104' into a process line (not shown) which carries the process material that is being measured, material entering inlet end 104 of the meter through flange 103 is conducted through manifold 150 to flow tube mounting block 120. Within manifold 150 the material is divided and routed through flow tubes 130 and 130'. Upon exiting flow tubes 130 and 130', the process material is recombined in a single stream within manifold 150 and is thereafter routed to exit end 104' connected by flange 103' to the process line (not shown).

Both flow tubes 130 and 130' are driven by driver 180 in opposite directions and at what is termed the first out-of-phase bending mode of the flow meter. This driver 180 may comprise any one of many well-known arrangements, such as a magnet mounted to flow tube 130' and an opposing coil mounted to flow tube 130 and through which an alternating current is passed for vibrating both flow tubes. A suitable driver voltage is applied by meter electronics 20 to driver 180.

Meter electronics 20 provides the drive signal to driver 180 to vibrate flow tubes 130 and 130'. Meter electronics 20 receives the left and right velocity signals from velocity pick-off sensors 170L and 170R to compute the mass flow rate, volumetric rate, and/or density information for the flow passing through meter assembly 10.

Flow meter 100 further comprises a case (not pictured) that protects the vibrating flow tubes. In the example of flow meter 100, the case couples to the flow tube mounting blocks 120, 120'. However, in further embodiments the case may couple to other parts of flow meter 100. For example, the case may couple to any other part of manifold 150, or flanges 103, 103'.

While the example of flow meter 100 includes two curved flow tubes, those of skill will understand that other configurations of flow meter 100 are possible. For example, flow meter 100 may comprise one or any number of flow tubes, in straight or curved flow tube configurations.

Installing flow meter 100 by attaching flanges 103, 103' to a process line can apply clamping forces in the axial direction to the flow tubes. Flow tubes 130, 130' are sensitive to axial stress, which can change the natural frequency of the flow tubes 130, 130'. Changing the natural frequency of flow tubes 130, 130' can interfere with flow meter 100 measurements, creating errors in the flow meter data.

Figure 2A:
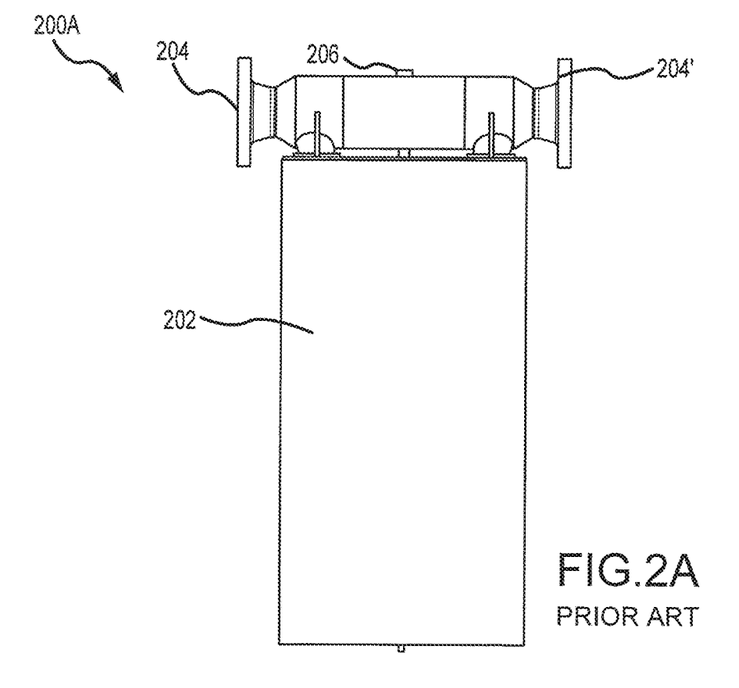
FIG. 2A depicts flow meter 200A, in accordance with an embodiment.

In prior embodiments, spacing between the inlet and outlet of a Coriolis flow meter was often maintained by positioning a spacer between manifolds as necessary. For example, FIG. 2A depicts flow meter 200A. Flow meter 200A includes a case 202, within which the flow tubes (not pictured) are positioned. A stainless-steel spacer 206 is positioned between flanges 204, 204' to maintain the spacing of the flanges, thereby preventing clamping forces from the flanges 204, 204' from affecting the flow tubes within case 202, which could increase the sensor error.

Figure 2B:
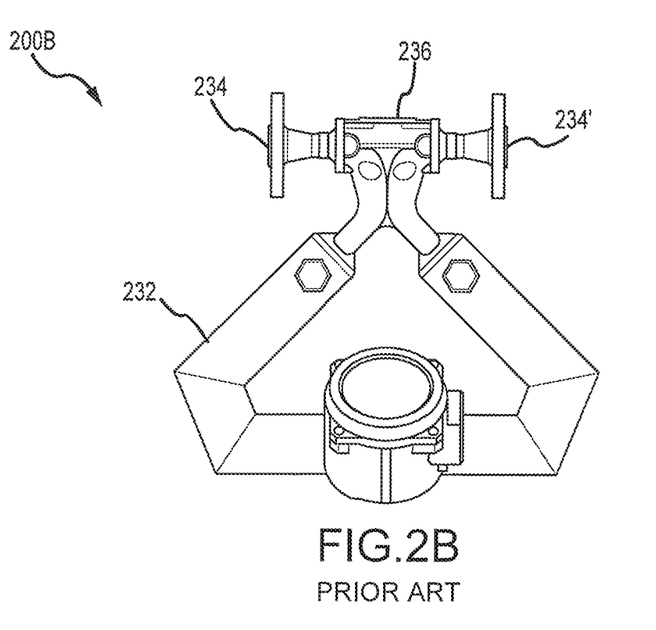
FIG. 2B depicts flow meter 200B, in accordance with an embodiment.

FIG. 2B depicts a further prior flow meter 200B. Flow meter 200B includes a case 232 that surrounds the flow tubes (not pictured) and a casing 236 that provides an integrated manifold and spacer component between flanges 234, 234'. The casing 236 maintains the spacing between flanges 234, 234', thereby preventing the clamping strain from affecting the spacing of the flow tubes.

Figure 2C:
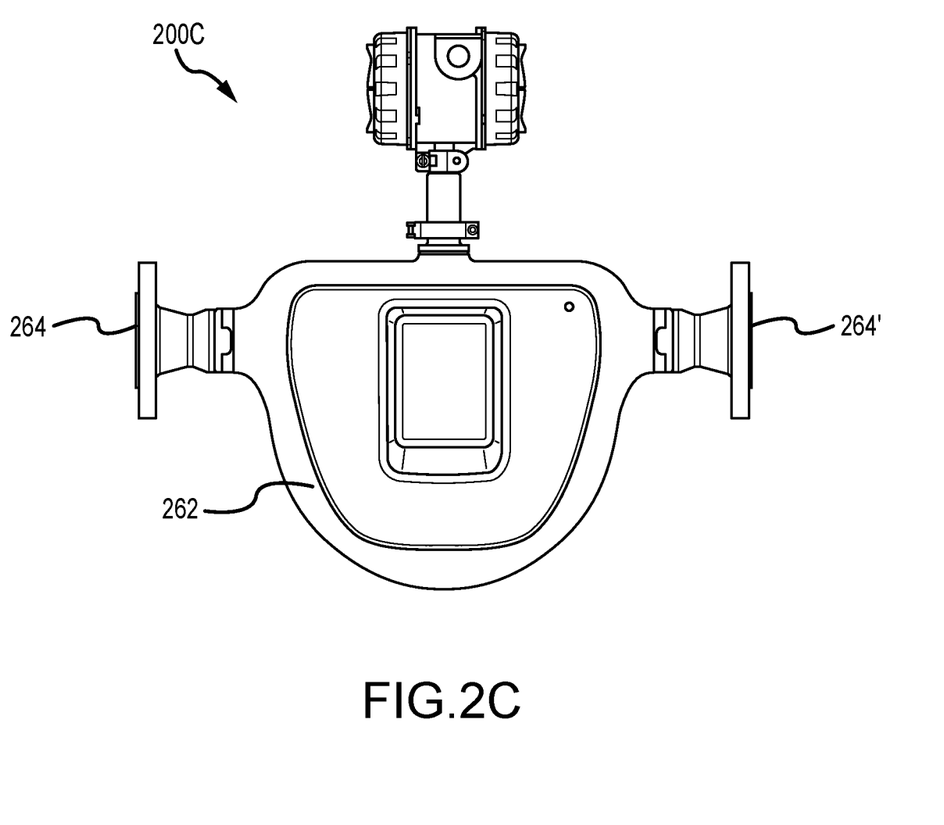
FIG. 2C depicts flow meter 200C, in accordance with an embodiment.

More recently, in order to lower costs and reduce complexity, the spacer function has been incorporated into some flow meter cases. For example, FIG. 2C depicts a flow meter 200C that corresponds to a Micro Motion CMFS model flow meter. Flow meter 200C includes a case 262 that performs a spacer function between flanges 264, 264'. In some circumstances, however, case 262 can transfer just enough of the axial clamping forces to the flow tubes to interfere with sensitive activities, such as meter calibration activities. Therefore, in order to verify meter accuracy, it is desirable to remove the axial clamping force on the flow tubes prior to meter testing, or prior to use of the meter.

What is needed is a way to couple a flow meter to a process line or a test setup without transferring clamping forces to the meter flow tubes.

SUMMARY

In an embodiment, a flow meter coupling system to reduce axial stress on a flow meter comprising a first flow meter flange and a second flow meter flange is provided. The flow meter coupling system comprises a first process fluid member configured to be coupled to the first flow meter flange of the flow meter, a second process fluid member, and a second connector member configured to be rigidly coupled to at least one of the second flow meter flange or the second process fluid member and coupled to another of the second flow meter flange or the second process fluid member in a manner that provides substantially no axial stress.

In an embodiment, a method for reducing axial stress when coupling a flow meter to a flow meter coupling system is provided. The flow meter comprises a flow meter case, a first flow meter flange, and a second flow meter flange. The flow meter coupling system comprises a flow meter alignment apparatus, a first process fluid member, a second process fluid member, a first connector member, and a second connector member. The method comprises positioning the flow meter case in the flow meter alignment apparatus of the flow meter coupling system. The method further comprises rigidly coupling the second connector member to at least one of the second flow meter flange or the second process fluid member using the second connector member. The method further comprises coupling the second connector member to another of the second flow meter flange or the second process fluid member using the second connector member in a manner that provides substantially no axial stress.

ASPECTS

In an embodiment, the flow meter coupling system may further comprise a first connector member rigidly coupled to the first process fluid member and the first flow meter flange.

In an embodiment, the first process fluid member may be an inlet and the second process fluid member may be an outlet for a fluid.

In an embodiment, the flow meter coupling system may further comprise a flow meter alignment apparatus comprising at least one hanger for suspending the flow meter by a flow meter case.

In an embodiment, the first connector member may further comprise a first connector process fluid member collar configured to be coupled to the first process fluid member at a first process fluid member end of the first connector member, and a first connector flow meter interfacing member configured to be coupled to the first flow meter flange at a flow meter end of the first connector member.

In an embodiment, the first connector member may further comprise a flow reducer/increaser coupled to the first connector process fluid member collar at an end opposing the process fluid member end and coupled to the first connector flow meter interfacing member at an end opposing the flow meter end.

In an embodiment, the second connector member may further comprise a second connector rigid interfacing member, a second connector conduit member, and a second connector slidable coupler configured to sealably couple the second connector conduit member to the second process fluid member.

In an embodiment, the second connector slidable coupler may further comprise a seal seat and an inflatable seal configured to be positioned within the seal seat, providing radial pressure to the second connector slidable coupler.

In an embodiment, the second connector rigid interfacing member may be coupled to the second flow meter flange and the second connector slidable coupler may be coupled to the second process fluid member.

In an embodiment, the method may further comprise rigidly coupling the first process fluid member to the first flow meter flange with the first connector member.

In an embodiment, the first process fluid member may be an inlet and the second process fluid member may be an outlet for a fluid.

In an embodiment, rigidly coupling the first process fluid member to the first flow meter flange with the first connector member may further comprise coupling a first connector process fluid member collar to the first process fluid member at a first process fluid member end of the first connector member, and coupling a first connector flow meter interfacing member to the first flow meter flange at a flow meter end of the first connector member.

In an embodiment, rigidly coupling the first process fluid member to the first flow meter flange with the first connector member may further comprise coupling a flow reducer/increaser to the first connector process fluid member collar at an end opposing the process fluid member end, and coupling the flow reducer/increaser to the first connector flow meter interfacing member at an end opposing the flow meter end.

In an embodiment, rigidly coupling the second connector member to at least one of the second flow meter flange or the second process fluid member using the second connector member may further comprise coupling a second connector conduit member to a second connector rigid interfacing member, and coupling the second connector rigid interfacing member to the at least one of the second flow meter flange or the second process fluid member, and slidably coupling the second connector member to another of the second flow meter flange or the second process fluid member using the second connector member may further comprise slidably coupling a second connector slidable coupler sealably to the second connector conduit member.

In an embodiment, slidably coupling the second connector slidable coupler sealably to the second connector conduit member may further comprise threading a seal seat and an inflatable seal positioned within the seal seat over the second connector conduit member, and inflating the inflatable seal to provide radial pressure to the second connector conduit member.

In an embodiment, the second connector rigid interfacing member may be coupled to the second flow meter flange and the second connector slidable coupler may be coupled to the second process fluid member.

BRIEF DESCRIPTION OF THE DRAWINGS

The same reference number represents the same element on all drawings. The drawings are not necessarily to scale.

DETAILED DESCRIPTION

FIGS. 3A-5B and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 3A:
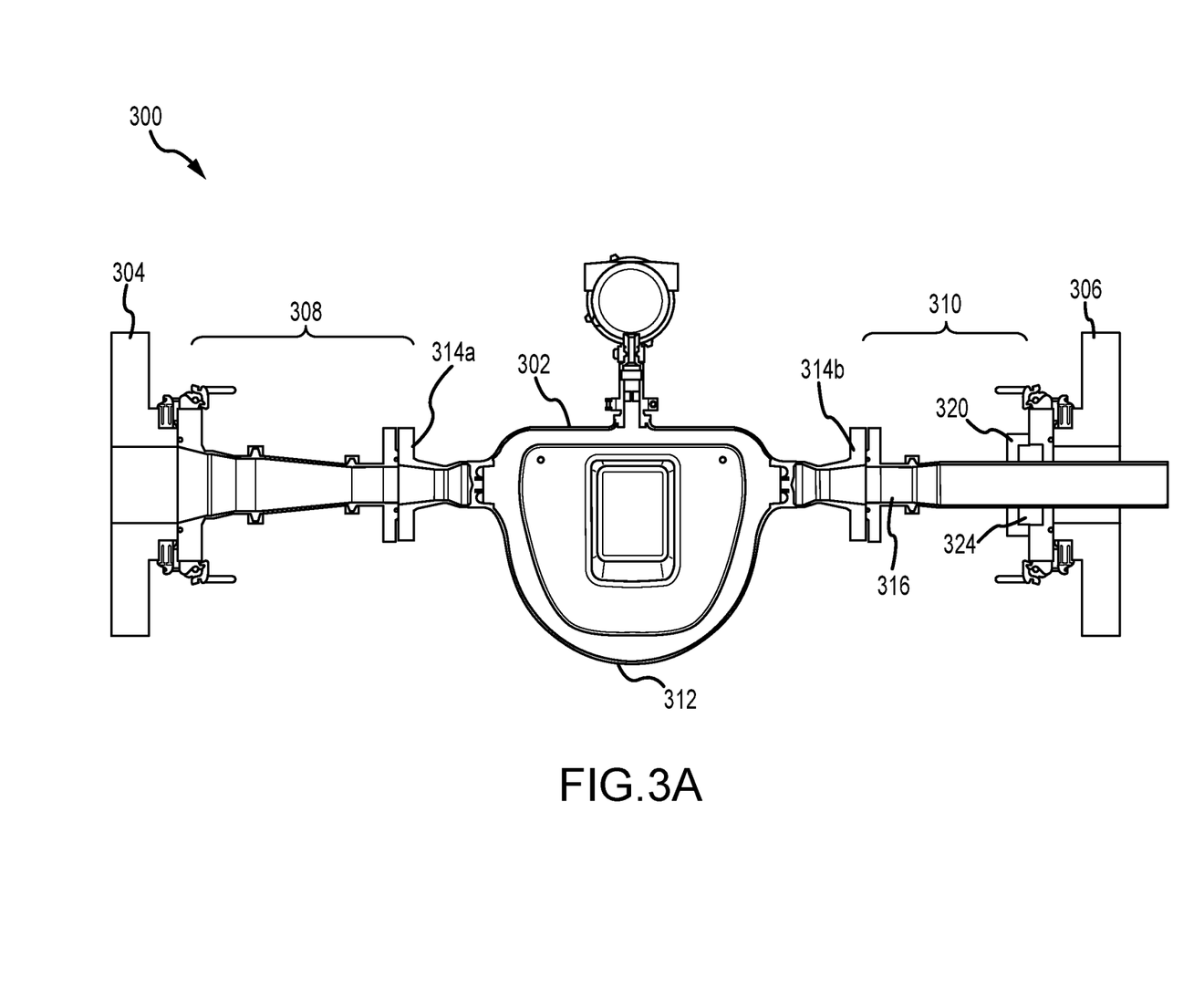
FIG. 3A depicts flow meter coupling system 300, in accordance with an embodiment.
Figure 3B:
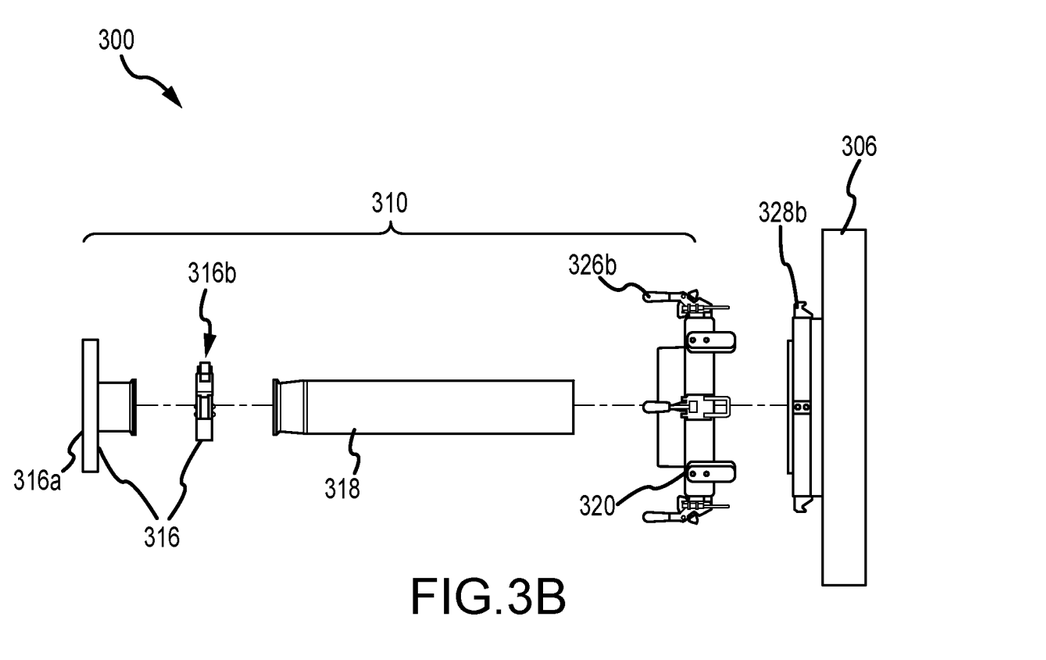
FIG. 3B depicts flow meter coupling system 300, in accordance with an embodiment.
Figure 3C:
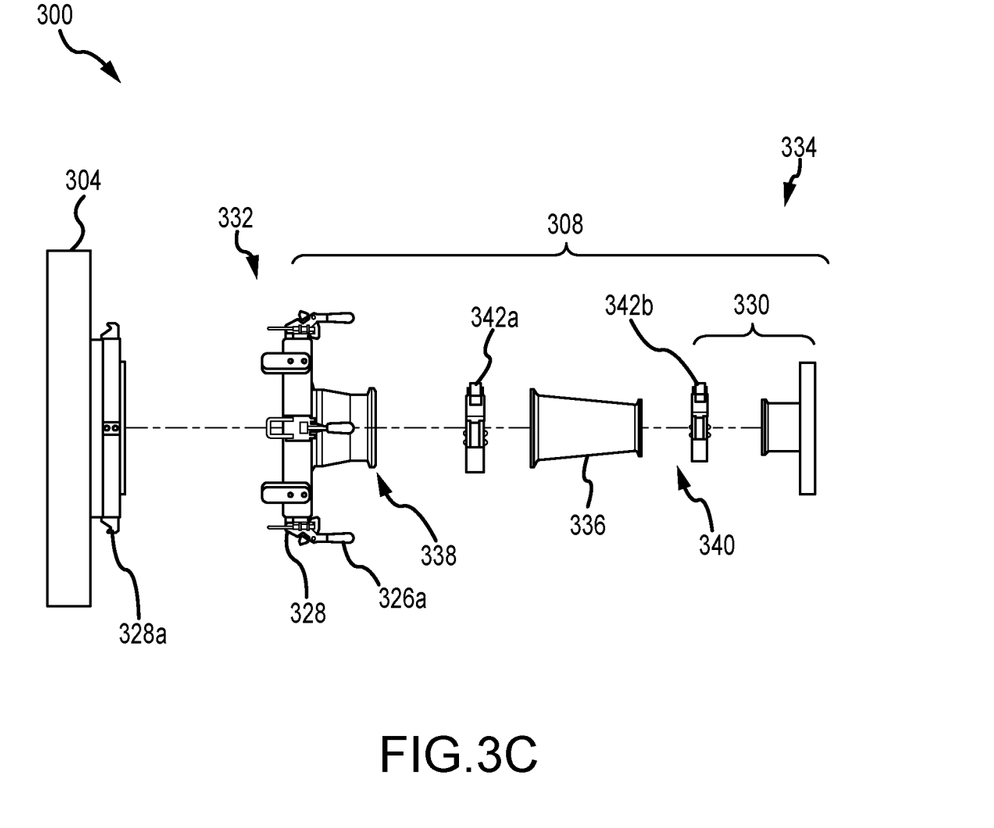
FIG. 3C depicts flow meter coupling system 300, in accordance with an embodiment.

FIG. 3A depicts an example embodiment of flow meter coupling system 300, depicted as coupled to a flow meter 302. FIG. 3B depicts a detail of a second process fluid member 306 and a second connector member 310 of flow meter coupling system 300, and FIG. 3C depicts a detail of a first connector member 308 and a first process fluid member 304 of flow meter coupling system 300.

Flow meter coupling system 300 may be used to support normal process operations of flow meter 302. Flow meter coupling system 300 may also be used to support testing, characterizing, and/or calibration of flow meter 302. Flow meter coupling system 300 may be used to connect flow meter 302 to first process fluid member 304 and second process fluid member 306 in a manner that minimizes axial stress experienced at the flow meter 302, allowing a fluid to be flowed between first process fluid member 304 and second process fluid member 306 in either direction, through flow meter 302.

In the example embodiment of flow meter coupling system 300 depicted in FIG. 3A, flow meter 302 is coupled to first and second process fluid members 304, 306, which are head stocks. This is not intended to be limiting, however. In further examples, flow meter coupling system 300 may be used to couple flow meter 302 to a process pipeline, and first and second process fluid members 304 and 306 may comprise a first coupling end of the process pipeline and a second coupling end of the process pipeline.

In embodiments, flow meter 302 may comprise a dual, curved flow tube Coriolis flow meter like flow meters 100, 200A, 200B, or 200C. In further embodiments, however, flow meter 302 may comprise a Coriolis flow meter including any number of flow tubes in any possible configuration.

Flow meter 302 comprises a first flange 314a and a second flange 314b. In embodiments, first flange 314a and second flange 314b may comprise any type of conduit coupler known to those of skill in the art.

Flow meter 302 comprises a flow meter case 312. Much like case 262 depicted in FIG. 2C, which provides a spacer function for the flow meter manifolds within case 262, case 312 also performs a spacer function between manifolds (not depicted) for flow meter 302. In further embodiments, flow meter 302 may include any kind of flow meter case known to those of skill, including any variation of a flow meter case that does or does not provide a spacer function. In further embodiments, however, flow meter 302 may not comprise a case, but may comprise another structure to maintain the spacing between flow meter manifolds.

Flow meter coupling system 300 comprises first process fluid member 304 and second process fluid member 306, first process fluid member 304 and second process fluid member 306 comprise inlets or outlets for fluid to be flowed through flow meter 302 during normal customer use of the meter, or during meter testing, calibration, characterization. First process fluid member 304 and second process fluid member 306 are stationary, meaning temporarily or permanently fixed. First process fluid member 304 and second process fluid member 306 fluidly connect flow meter 302 to one or more conduits or reservoirs of fluid to be measured by flow meter 302.

First process fluid member 304 is configured to be coupled to the first flow meter flange 314a of the flow meter. Example first process fluid member 304 comprises a stationary vertical structure coupled to a band surrounding a fluid passageway. First flow meter flange 314a may be coupled to first process fluid member 304 using any type of coupling known to those of skill.

Second process fluid member 306 is configured to be coupled to the second flow meter flange 314b. Example second process fluid member 306 also comprises a stationary vertical structure coupled to a band surrounding a fluid passageway to which second flow meter flange 314b may be coupled using any type of coupling known to those of skill.

Flow meter coupling system 300 further comprises a second connector member 310. An exploded view of second connector member 310 is depicted in FIG. 3B. Second connector member 310 couples the second flow meter flange 314b to the second process fluid member 306 by rigidly coupling at least one of the second flow meter flange 314b or the second process fluid member 306, and coupled to another of the second flow meter flange 314b or the second process fluid member 306 in a manner that provides substantially no axial stress.

In embodiments, the second connector member 310 may further comprise a second connector rigid interfacing member 316, a second connector conduit member 318, and a second connector slidable coupler 320 configured to sealably couple the second connector conduit member 318 to the second process fluid member 306.

Second connector rigid interfacing member 316 rigidly couples the second connector conduit member 318 to the second flow meter flange 314b or the second process fluid member 306. By rigidly coupled, what is meant is that the connector members are mechanically clamped in a manner that utilizes axial force. In the example of flow meter coupling system 300, second connector ridged interfacing member 316 comprises a second connector flange 316a and a second connector clamp 316b. In embodiments, the second connector flange 316a may comprise a surface with apertures that match up with apertures in second flow meter flange 314b, thereby allowing fasteners to couple the flanges together. Second connector clamp 316b may comprise any method of rigidly joining second connector flange 316a to second connector conduit member 318 known to those of skill. In embodiments, second connector clamp 316b may comprise a sanitary clamp.

Second connector conduit member 318 comprises a conduit configured to be coupled rigidly at one end and in a manner that provides substantially no axial stress at a second end. In the embodiment of flow meter coupling system 300, second connector conduit member 318 is a straight conduit with a small flange feature at one end.

Second connector slidable coupler 320 comprises a slidable coupler that provides a sealed connection between second process fluid member 306 and second connector conduit member 318. Slidable coupler 320 may be coupled to any axial position along second connector conduit member 318 where slidable coupler 320 may be fully seated. Because the axial position where slidable coupler 320 and second connector conduit member 318 couple together is not restricted, this may substantially reduce the axial stress between flow meter coupling system 300 and flow meter 302. In embodiments, slidable coupler 320 may substantially reduce the axial stress between flow meter coupling system 300 and flow meter 302 by 70%, 90% or 100% over prior art setups with dual flange couplings.

Figure 3D:
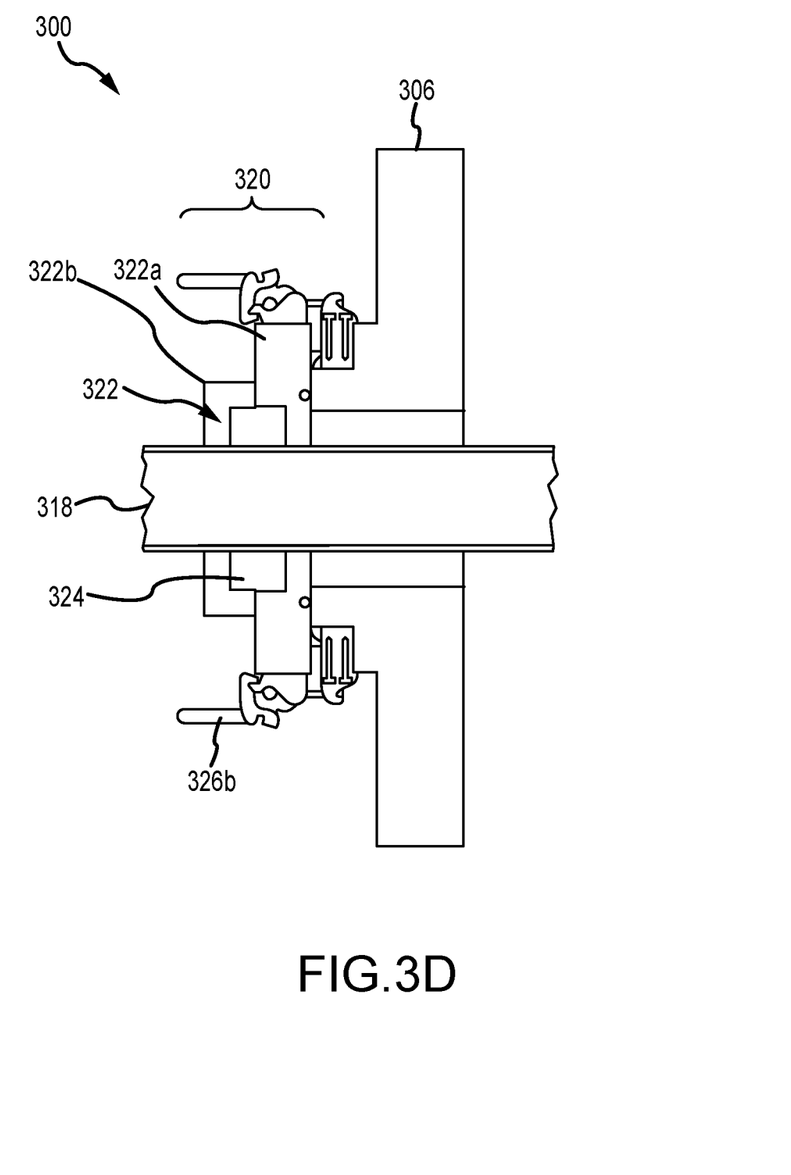
FIG. 3D depicts flow meter coupling system 300, in accordance with an embodiment.

FIG. 3D provides a detail cutaway view of example second connector slidable coupler 320. As may be seen in the figure, second connector slidable coupler 320 may further comprise a seal seat 322 and an inflatable seal 324.

Inflatable seal 324 may be configured to be positioned within the seal seat 322, providing radial pressure to the second connector slidable coupler 320 to prevent fluid from leaking from second connector member 310.

In the embodiment of flow meter coupling system 300, seal seat 322 comprises a flange seal seat component 322a with an annular recess coupled to a seal seat cover component 322b with an annular recess. The annular recesses of flange seal seat component 322a and seal seat cover component 322b face one another to form an inner annular void within seal seat 322.

Inflatable seal 324 comprises an annular-shaped expandable membrane configured to nest inside the inner annular void within seal seat 322. Inflatable seal 324 can be expanded by adding pressurized fluid to the interior of inflatable seal 324 via an inlet/outlet valve (not depicted), such as, for example, a Schrader valve. In examples, inflatable seal 324 may comprise, for example, a rubber inner tube forming a 40-durometer seal.

Second connector slidable coupler 320 further comprises a way to couple second connector slidable coupler 320 to one of second process fluid member 306 or second flow meter flange 314b. In the example of flow meter coupling system 300, flange seal seat component 322a comprises one or more toggle levers 326b configured to engage hook-like elements 328b coupled to second process fluid member 306. Other methods of rigidly coupling second connector slidable coupler 320 to one of second process fluid member 306 or second flow meter flange 314b are also possible, as will be understood by those of skill.

In embodiments, second connector rigid interfacing member 316 and second connector conduit member 318 may be formed from multiple sections that are coupled together. In further embodiments, however, second connector ridged interfacing member 316 and second connector conduit member 318 may be formed as an integrated part.

In the embodiment of flow meter coupling system 300, second connector rigid interfacing member 316 is coupled to second flow meter flange 314b and second connector slidable coupler 320 is coupled to second process fluid member 306. This is not intended to be limiting, however. In further embodiments, second connector rigid interfacing member 316 may be coupled to second process fluid member 306 and second connector slidable coupler 320 may be coupled to second flow meter flange 314b.

In embodiments, flow meter coupling system 300 may further comprise a first connector member 308. First connector member 308 couples first process fluid member 304 to first flow meter flange 314a. In embodiments, first connector member 308 may rigidly couple first process fluid member 304 to first flow meter flange 314a. In further embodiments, however first connector member 308 may couple first process fluid member 304 to first flow meter flange 314a in a manner that provides substantially no axial stress.

In embodiments, first connector member 308 may comprise a first connector process fluid member collar 328 and a first connector flow meter interfacing member 330.

First connector process fluid member collar 328 may be configured to be coupled to first process fluid member 304 at a process fluid member end 332 of first connector member 308. In embodiments, first connector process fluid member collar 328 may comprise a first flange-like or annular member coupled to one or more toggle levers 326a configured to engage hook-like elements 328a coupled to first process fluid member 304 to create a seal.

First connector flow meter interfacing member 330 may be configured to be coupled to first flow meter flange 314a at a flow meter end 334 of first connector member 308. In embodiments, first connector flow meter interfacing member 330 may comprise a flange configured to be coupled to first flow meter flange 314a.

In further embodiments, first connector member 308 may further comprise a flow reducer/increaser configured to increase or decrease the diameter of the flow between first process fluid member 304 or first connector process fluid member collar 328. Flow reducer/increaser 336 may be coupled to the first connector process fluid member collar 328 at an end opposing the process fluid member end 338 and coupled to first connector flow meter interfacing member 330 at an end opposing the flow meter end 340.

In embodiments, flow reducer/increaser 336 may comprise a flange-like feature at opposing ends configured to allow flow reducer/increaser 336 to be coupled to first connector process fluid member collar 328 and first connector flow meter interfacing member 330. First connector process fluid member collar 328 and first connector flow meter interfacing member 330 may also comprise flange-like features configured to be coupled to flow reducer/increaser 336 via clamps 342a and 342b. In embodiments, clamps 342a and 342b may comprise sanitary clamps, or any type of clamps known to those of skill.

In embodiments of flow meter coupling system 300, first process fluid member 304 may comprise an inlet and second process fluid member 306 may comprise an outlet for a fluid. This may provide for less pressure on the second process fluid member 306 side of flow meter coupling system 300, thereby applying less pressure on inflatable seal 324.

In embodiments, flow meter coupling system 300 may further comprise a flow meter alignment apparatus (not depicted). The flow meter alignment apparatus comprises any method of holding flow meter 302 within flow meter coupling system 300 to align first flow meter flange 314a and second flow meter flange 314b with first process fluid member 304 and second process fluid member 306.

In embodiments, flow meter alignment apparatus may support flow meter 302 within flow meter coupling system 300 via one or more hangers, which may be used to suspend the flow meter by flow meter case 312. In embodiments, flow meter alignment apparatus may suspend flow meter case within flow meter coupling system 300 by supporting the section between first flow meter flange 314a and flow meter case 312, and the section between flow meter case 312 and second flow meter flange 314b. The example embodiment of one or more hangers is not intended to be limiting, however. Those of skill will readily understand that the flow meter alignment apparatus may comprise any manner to align and/or support flow meter 302 known to those of skill.

Figure 4A:
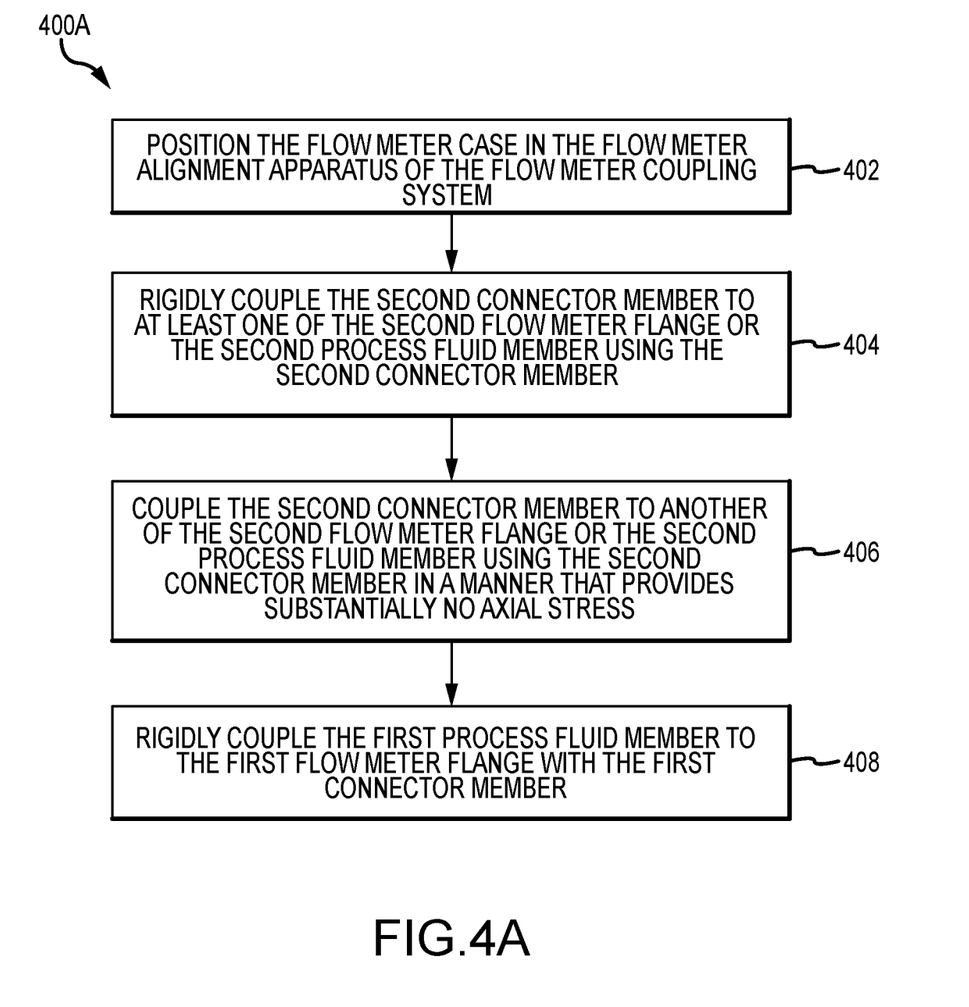
FIG. 4A depicts method 400A, in accordance with an embodiment.

FIG. 4A depicts method 400A, in accordance with an embodiment. Method 400A may be executed to reduce axial stress when coupling a flow meter comprising a flow meter case, a first flow meter flange, and a second flow meter flange, to a flow meter coupling system comprising a flow meter alignment apparatus, a first process fluid member, a second process fluid member, a first connector member, and a second connector member. For example, method 400A may be used to couple flow meter 302 to flow meter coupling system 300.

Method 400A begins with step 402. In step 402, the flow meter case is positioned in the flow meter alignment apparatus of the flow meter coupling system. For example, flow meter case 312 may be supported by two hangers positioned in the section between first flow meter flange 314a and flow meter case 312, and in the section between flow meter case 312 and second flow meter flange 314b, as described above.

Method 400A continues with step 404. In step 404, the second connector member is rigidly coupled to at least one of the second flow meter flange or the second process fluid member using the second connector member. For example, second connector member 310 may be coupled to second flow meter flange 314b, as described above and depicted in FIG. 3A.

Figure 4B:
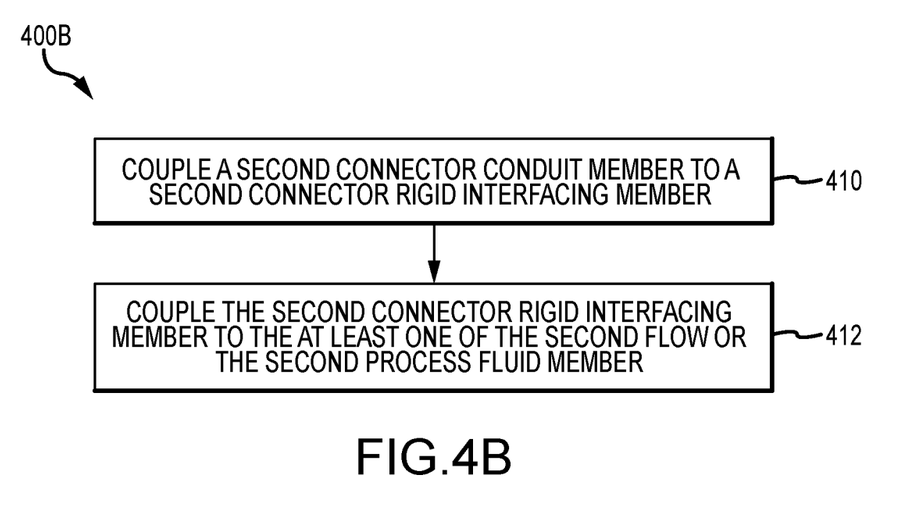
FIG. 4B depicts method 400B, in accordance with an embodiment.

In embodiments, step 404 may further comprise any combination of steps 410 and 412 of method 400B of FIG. 4B.

In step 410, a second connector conduit member may be coupled to a second connector rigid interfacing member. For example, second connector conduit member 318 may be coupled to second connector rigid interfacing member 316, as described above and depicted in FIG. 3B.

In step 412, the second connector rigid interfacing member may be coupled to the at least one of the second flow meter flange or the second process fluid member. For example, second connector rigid interfacing member 316 may be coupled to second flow meter flange 314b, as described above and depicted in FIG. 3A.

Method 400A continues with step 406. In step 406, the second connector member may be coupled to another of the second flow meter flange or the second process fluid member using the second connector member in a manner that provides substantially no axial stress. For example, second connector member 310 may be coupled to second process fluid member 306, as described above and depicted in FIG. 3A.

Figure 4C:
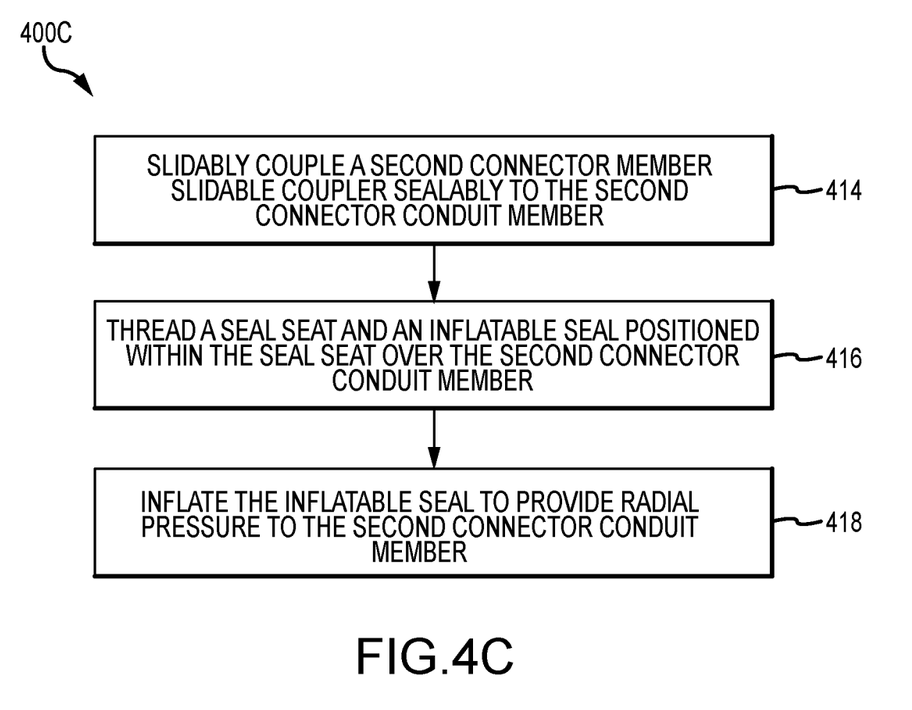
FIG. 4C depicts method 400C, in accordance with an embodiment.

In embodiments, step 406 may further comprise step 414 of method 400C of FIG. 4C. In step 414, a second connector slidable coupler may be slidably and sealably coupled to the second connector conduit member. For example, second connector slidable coupler 320 may be coupled to second connector conduit member 318, as described above.

In embodiments, step 414 of method 400C may further comprise steps 416 and 418 of method 400C. In step 416, a seal seat and an inflatable seal may be threaded to position the seal seat and inflatable seal within the seal seat over the second connector conduit member. For example, seal seat 322 and inflatable seal 324 may be threaded over second connector conduit member 318, as is best depicted in FIG. 3D.

In step 418, the inflatable seal may be inflated to provide radial pressure to the second connector conduit member. For example, inflatable seal 324 may be pressurized, as described above.

In embodiments, method 400A may further comprise step 408. In step 408, the first process fluid member may be rigidly coupled to the first flow meter flange with the first connector member. For example, first connector member 308 may be used to couple first process fluid member 304 rigidly to first flow meter flange 314a, as described above. Those of skill will readily recognize that step 408 is not intended to be limiting. In embodiments, first process fluid member 304 may alternatively be slidably coupled to first flow meter flange 314a similar to the way that second flow meter flange 314b is slidably connected to at least one of second flow meter flange 314b or second process fluid member 306.

Figure 4D:
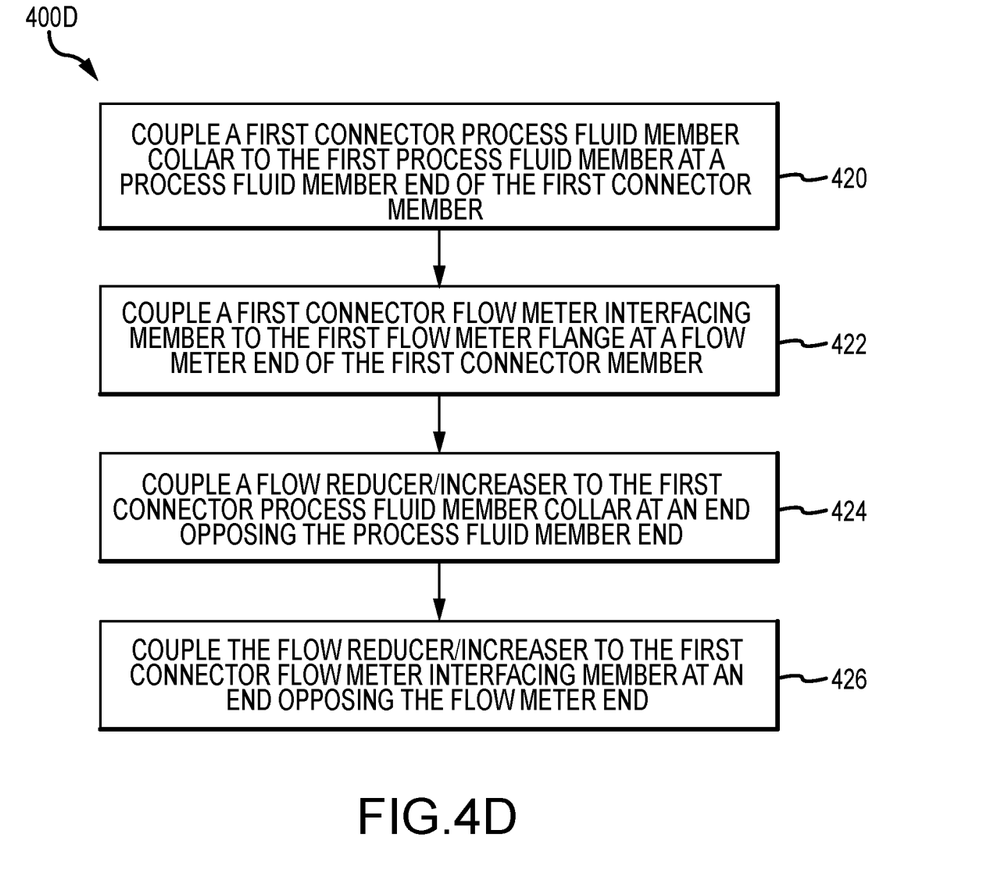
FIG. 4D depicts method 400D, in accordance with an embodiment.

In embodiments, step 408 may further comprise any combination of steps 420-426 of method 400D of FIG. 4D. In step 420, a first connector process fluid member collar may be coupled to the first process fluid member at a process fluid member end of the first connector member. For example, first connector process fluid member collar 328 may be coupled to first process fluid member 304, as described above.

In step 422, a first connector flow meter interfacing member may be coupled to the first flow meter flange at a flow meter end of the first connector member. For example, first connector flow meter interfacing member 330 may be coupled to first flow meter flange 314a, as descried above.

In step 424, a flow reducer/increaser may be coupled to the first connector process fluid member collar at an end opposing the process fluid member end. For example, flow reducer/increaser 336 may be coupled to first connector process fluid member collar 328, as described above.

In step 426, the flow reducer/increaser may be coupled to the first connector flow meter interfacing member at an end opposing the flow meter end. For example, flow reducer/increaser 336 may be coupled to first connector flow meter interfacing member 330, as described above.

Figure 5A:
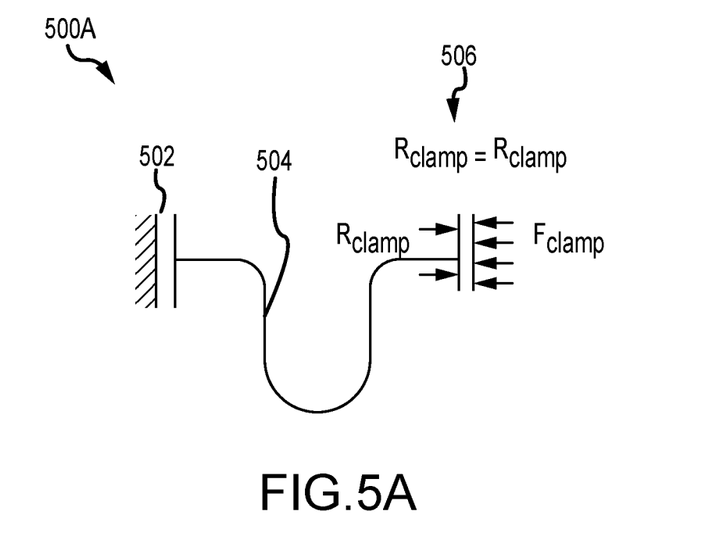
FIG. 5A depicts flow meter coupling system 500A, in accordance with an embodiment.

FIG. 5A depicts axial clamping forces under a prior flow meter flow meter coupling system 500A including a rigidly coupled first process fluid member 502, a flow meter 504, and a rigidly coupled second process fluid member 506. As may be seen in the figure, the rigid coupling between flow meter 504 and second process fluid member 506 generates a clamping force $F_{clamp}$ and a reaction force $R_{clamp}$ in the axial direction of the flow meter conduit. In embodiments, the reaction force $R_{clamp}$ can place forces on flow meter 504 flow tubes, which may impact the flow meter data accuracy.

Figure 5B:
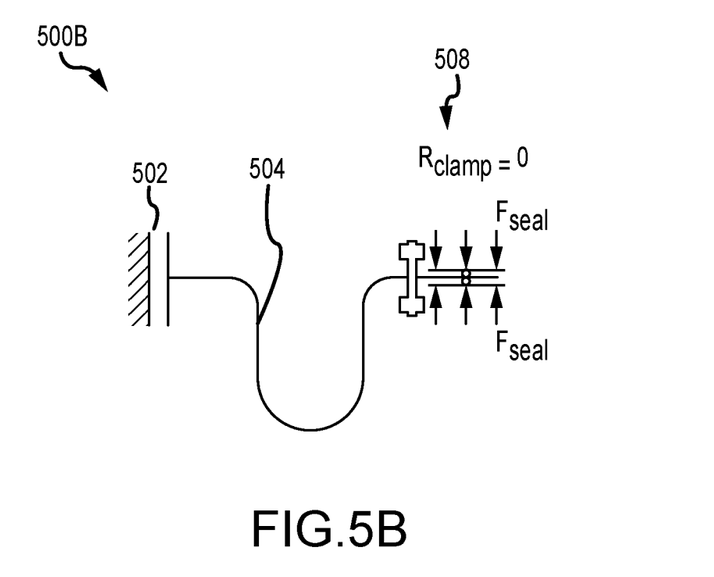
FIG. 5B depicts flow meter coupling system 500B, in accordance with an embodiment.

FIG. 5B depicts clamping forces under a flow meter flow meter coupling system 500B according to an embodiment of the Application. flow meter coupling system 500B comprises a rigidly coupled first process fluid member 502, a flow meter 504, and a second process fluid member 508 coupled in a manner that provides substantially no axial stress. As may be seen in the figure, the connection between flow meter 504 and second process fluid member 506 comprises substantially no axial clamping force $F_{clamp}$ or reaction force $R_{clamp}$. Instead, the second process fluid member 508 comprises radial sealing forces $F_{seal}$ from an inflatable seal in the radial direction of the flow meter conduit. Radial sealing forces $F_{seal}$ are much less likely to bend or place any strain on the flow tubes of flow meter 504, thereby maintaining the accuracy of flow meter 504.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A flow meter coupling system (300) to reduce axial stress on a flow meter (302) comprising a first flow meter flange (314a) and a second flow meter flange (314b), the flow meter coupling system (300) comprising:
   a first process fluid member (304) configured to be coupled to the first flow meter flange (314a) of the flow meter (302);
   a second process fluid member (306);
   a second connector member (310) comprising a second connector conduit member (318) and a second connector slidable coupler (320), the second connector member (310) configured to be fixedly coupled to at least one of the second flow meter flange (314b) and the second process fluid member (306) and slidingly and sealably coupled to another of the second flow meter flange (314b) or the second process fluid member (306), wherein the second connector slidable coupler (320) is configured to slidingly and sealably couple to the second connector conduit member (318), wherein axial motion of the second connector conduit member (318) is not fixed in relation to the second connector slidable coupler (320) in a manner that transfers substantially no axial stress from axial movement from one or more of the first process fluid member (304) and the second process fluid member (306) to the flow meter (302).

2. A flow meter coupling system (300) as claimed in claim 1, further comprising:
a first connector member (308) fixedly coupled to the first process fluid member (304) and the first flow meter flange (314a).

3. A flow meter coupling system (300) as claimed in claim 1, wherein the first process fluid member (304) is an inlet and the second process fluid member (306) is an outlet for a fluid.

4. A flow meter coupling system (300) as claimed in claim 1, wherein the flow meter coupling system (300) further comprises a flow meter alignment apparatus comprising at least one hanger for suspending the flow meter (302) by a flow meter case (312).

5. A flow meter coupling system (300) as claimed in claim 1, wherein the first connector member (308) further comprises:
a first connector process fluid member collar (328) configured to be coupled to the first process fluid member (304) at a first process fluid member end (332) of the first connector member (308); and
a first connector flow meter interfacing member (330) configured to be coupled to the first flow meter flange (314a) at a flow meter end (334) of the first connector member (308).

6. A flow meter coupling system (300) as claimed in claim 5, wherein the first connector member (308) further comprises:
a flow reducer/increaser (336) coupled to the first connector process fluid member collar (328) at an end opposing the process fluid member end (338) and coupled to the first connector flow meter interfacing member (330) at an end opposing the flow meter end (340).

7. A flow meter coupling system (300) as claimed in claim 1, wherein the second connector member (310) further comprises:
a second connector rigid interfacing member (316).

8. A flow meter coupling system (300) as claimed in claim 7, wherein the second connector slidable coupler (320) further comprises:
a seal seat (322); and
an inflatable seal (324) configured to be positioned within the seal seat (322), providing radial pressure to the second connector slidable coupler (320).

9. A flow meter coupling system (300) as claimed in claim 7, wherein the second connector rigid interfacing member (316) is coupled to the second flow meter flange (314b) and the second connector slidable coupler (320) is coupled to the second process fluid member (306).

10. A method for reducing axial stress when coupling a flow meter (302) to a flow meter coupling system, the flow meter comprising a flow meter case (312), a first flow meter flange (314a), and a second flow meter flange (314b), and the flow meter coupling system (300) comprising a flow meter alignment apparatus, a first process fluid member (304), a second process fluid member (306), a first connector member (308), and a second connector member (310), the method comprising:
positioning the flow meter case (312) in the flow meter alignment apparatus of the flow meter coupling system (300);
fixedly coupling the second connector member (310) to one of the second flow meter flange (314b) and the second process fluid member (306) using the second connector member (310), wherein the second connector member comprises a second connector conduit member (318) and a second connector slidable coupler (320); and
slidingly and sealably coupling the second connector member (310) to another of the second flow meter flange (314b) or the second process fluid member (306) wherein the second connector slidable coupler (320) is slidingly and sealably coupled to the second connector conduit member (318) so that axial motion of the second connector conduit member (318) is not fixed in relation to the second connector slidable coupler (320) in a manner that transfers substantially no axial stress from axial movement of one or more of the first process fluid member (304) and the second process fluid member (306) to the flow meter (302).

11. A method as claimed in claim 10, the method further comprising:
fixedly coupling the first process fluid member (304) to the first flow meter flange (314a) with the first connector member (308).

12. A method as claimed in claim 10, wherein the first process fluid member (304) is an inlet and the second process fluid member (306) is an outlet for a fluid.

13. A method as claimed in claim 11, wherein fixedly coupling the first process fluid member (304) to the first flow meter flange (314a) with the first connector member (308) further comprises:
coupling a first connector process fluid member collar (328) to the first process fluid member (304) at a first process fluid member end (332) of the first connector member (308); and
coupling a first connector flow meter interfacing member (330) to the first flow meter flange (314a) at a flow meter end (334) of the first connector member (308).

14. A method as claimed in claim 13, wherein fixedly coupling the first process fluid member (304) to the first flow meter flange (314a) with the first connector member (308) further comprises:
coupling a flow reducer/increaser (336) to the first connector process fluid member collar (328) at an end opposing the process fluid member end (338); and
coupling the flow reducer/increaser (336) to the first connector flow meter interfacing member (330) at an end opposing the flow meter end (340).

15. A method as claimed in claim 10, wherein fixedly coupling the second connector member (310) to at least one of the second flow meter flange (314b) or the second process fluid member (306) using the second connector member (310) further comprises:
coupling a second connector conduit member (318) to a second connector rigid interfacing member (316), and coupling the second connector rigid interfacing member (316) to the at least one of the second flow meter flange (314*b*) or the second process fluid member (306); and wherein slidably coupling the second connector member (310) to another of the second flow meter flange (314*b*) or the second process fluid member (306) using the second connector member (310) further comprises:

slidably coupling a second connector slidable coupler (320) sealably to the second connector conduit member (318).

16. A method as claimed in claim 15, wherein slidably coupling the second connector slidable coupler (320) sealably to the second connector conduit member (318) further comprises:

threading a seal seat (322) and an inflatable seal (324) positioned within the seal seat (322) over the second connector conduit member (318); and inflating the inflatable seal (324) to provide radial pressure to the second connector conduit member (318).

17. A method as claimed in claim 10, wherein the second connector rigid interfacing member (316) is coupled to the second flow meter flange (314*b*) and the second connector slidable coupler (320) is coupled to the second process fluid member (306).

\* \* \* \* \*